Jan. 19, 1932.                J. WILSON                1,841,866
                      DRINKING VESSEL FOR ANIMALS
                          Filed April 8, 1930
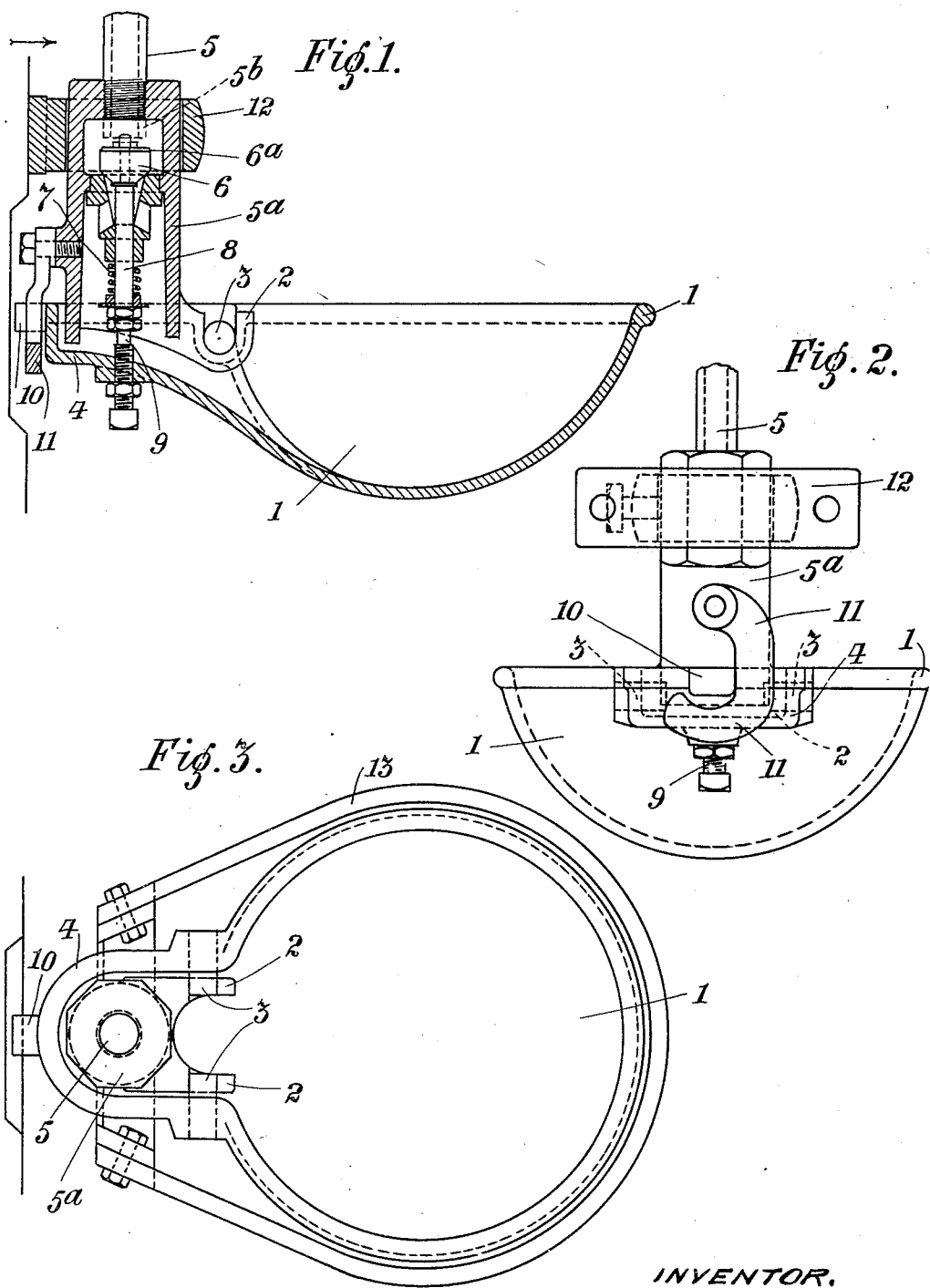
INVENTOR.
JOHN WILSON,
BY
ATTORNEYS Patented Jan. 19, 1932

1,841,866

UNITED STATES PATENT OFFICE

JOHN WILSON, OF BELFAST, NORTHERN IRELAND, ASSIGNOR OF ONE-HALF TO HERBERT WILLIAM BATKIN, AND ONE-HALF TO HERBERT SAMUEL MORRIS, BOTH OF PREES, WHITCHURCH, SALOP, ENGLAND

DRINKING VESSEL FOR ANIMALS

Application filed April 8, 1930, Serial No. 442,531, and in Great Britain May 27, 1929.

This invention relates to drinking vessels for animals. It is well known to provide a drinking bowl for animals in which a grid, treadle or tongue, connected with a lever, is inserted in the bowl to be pressed by the animal and thereby operates the water supply valve. These lever devices with the grid or like in the bowl are complicated and unsatisfactory.

According to this invention an animal drinking bowl is provided which requires no grid or secondary apparatus for operating the supply valve, the water valve being operated by movement, or direct action, of the bowl.

In carrying out the invention, according to one example, the bowl is mounted on a bearing at the end of the water supply pipe in which the valve is provided, the spindle of the valve projecting into contact with an extension of the bowl which embraces the bottom of the water supply pipe behind the bearing on which the bowl is supported. The arrangement is such that when the bowl is pressed down by the animal the extension thereof, which embraces the end of the water supply pipe, will be turned upwards, thereby lifting the valve spindle against the action of a spring and water pressure and so opening the valve to supply water to the bowl. When the animal removes its head from the bowl, the latter will be returned to its normal position by the reaction of the spring and water pressure, which also closes the valve and so shuts off the water.

The invention will now be further described, by way of example, with reference to the accompanying drawings:—

Fig. 1 is an elevation, partly in section of a cattle bowl and water supply thereto, constructed in accordance with the invention.

Fig. 2 is a back elevation corresponding to Fig. 1.

Fig. 3 is a plan view, corresponding to Fig. 1, but without the bracket and catch.

Referring to the drawings:—

A bowl 1 is pivotally supported in the bearings 2 by the journals 3. An extension 4 of the bowl 1 surrounds an enlargement 5a at the bottom of a water supply pipe 5. Contained in the enlarged end 5a of the water supply pipe 5 is a valve 6 which is held in the closed position by a spring 7 and also by the water pressure. A set screw 9, connected with the bowl extension 4, bears at its top against the bottom of the valve spindle 8 or the latter may rest directly on the extension of the bowl. A projection 10 is provided at the back of the bowl extension 4, its purpose being to limit the upward tilting of the bowl owing to the projection 10 being limited in movement by a catch 11. The upper portion of the enlargement 5a of the supply pipe 5 is made octagonal so that the bowl can be held thereby at different angles to the wall or stall and securely held so that it will not turn or twist in the wall bracket 12.

The arrangement described is such that when the animal puts its head into the bowl 1 for the purpose of taking a drink, it presses the bowl down about the journals 3, thus forcing up the valve spindle 8 against the action of the spring 7 and the water pressure, and opening the valve 6, whereby water will flow into the bowl 1. When the animal raises its head, the spring 7 forces down the valve spindle 8 thus closing the valve 6 and raising the bowl 1 to its normal position.

A guard, such as 13 in Fig. 2 may, if desired, be provided to prevent the animal from rubbing on the bowl and unintentionally opening the water valve.

As a further safeguard, the top 6a of the valve 6 may be adapted to co-operate with an extension 5b of the bottom of the water pipe to operate as a valve so that if the animal happens to push the bowl down too far the seat 6a will, by being held against the end 5b of the pipe, stop the flow of water therefrom.

Drinking vessels for cattle as hereinbefore described, have the advantage of simplicity of construction and in dispensing with the usual tongue or treadle, the collection of filth at the treadle in the bowl is avoided and the possibility of jamming of a bowl treadle by obstructions is also avoided. It is also claimed that the drinking bowl, according to this invention, keeps cleaner and more hygienic, as the cow or other animal cleans the bowl when drinking.

I claim:—

1. A drinking appliance for animals comprising a bowl, a trunnion mounting therefor, an extension of the bowl beyond the trunnion mounting, an adjustable tappet in said extension, a valve chest, a valve normally held closed by resilient means, and a valve stem bearing upon said tappet which when the bowl is depressed presses up the valve stem and opens the valve.

2. A drinking appliance for animals comprising a polygonal valve chest to which water is supplied, means for securing the valve chest to a fixed structure said means including an internally polygonal collar to grip the valve chest in any of a variety of positions, a valve normally held closed by resilient means, a bowl having lateral trunnions, lugs on the valve chest for the reception of the trunnions, an extension of the bowl beyond the trunnions, an adjustable tappet in said extension, and a stem on the valve bearing upon said tappet which when the bowl is depressed presses up the valve stem and opens the valve.

3. A drinking appliance for animals comprising a polygonal valve chest to which water is supplied, means for securing the valve chest to a fixed structure said means including an internally polygonal collar to grip the valve chest in any of a variety of positions, a valve normally held closed by resilient means, a bowl having lateral trunnions, lugs on the valve chest for the reception of the trunnions, an extension of the bowl beyond the trunnions, an adjustable tappet in said extension, a stem on the valve bearing upon said tappet which when the bowl is depressed presses up the valve stem and opens the valve and a fixed guard round the bowl.

4. A drinking appliance for animals comprising a polygonal valve chest to which water is supplied, means for securing the valve chest to a fixed structure said means including an internally polygonal collar to grip the valve chest in any of a variety of positions, a valve normally held closed by resilient means, a bowl having lateral trunnions, lugs on the valve chest for the reception of the trunnions, an extension of the bowl beyond the trunnions, an adjustable tappet in said extension, a stem on the valve bearing upon said tappet which when the bowl is depressed presses up the valve stem and opens the valve, a fixed guard round the bowl and stops for limiting the movement of the bowl.

5. A drinking appliance for animals comprising a polygonal valve chest to which water is supplied, means for securing the valve chest to a fixed structure, said means including an internally polygonal collar to grip the valve chest in any of a variety of positions, a valve normally held closed by resilient means, a bowl having lateral trunnions, open lugs on the valve chest for the reception of the trunnions, an extension of the bowl beyond the trunnions, an adjustable tappet in said extension, a stem on the valve bearing upon said tappet which, when the bowl is depressed, presses up the valve stem and opens the valve, a supply inlet in the valve chest which the valve closes when the bowl is depressed too far, a fixed guard round the bowl and stops for limiting the movement of the bowl.

In testimony whereof I affix my signature.

JOHN WILSON